United States Patent
Cacace

(10) Patent No.: US 9,772,456 B2
(45) Date of Patent: Sep. 26, 2017

(54) RECEIVING DEVICE AND METHOD FOR MANUFACTURING SUCH A RECEIVING DEVICE

(71) Applicant: AC OPTOMECHANIX, Eindhoven (NL)

(72) Inventor: Leonard Antonino Cacace, Eindhoven (NL)

(73) Assignee: AC Optomechanix, Eindhoven (NL)

( * ) Notice: Subject to any disclaimer, the term of this patent is extended or adjusted under 35 U.S.C. 154(b) by 0 days.

(21) Appl. No.: 15/027,974

(22) PCT Filed: Oct. 7, 2014

(86) PCT No.: PCT/NL2014/050699
§ 371 (c)(1),
(2) Date: Apr. 7, 2016

(87) PCT Pub. No.: WO2015/053625
PCT Pub. Date: Apr. 16, 2015

(65) Prior Publication Data
US 2016/0238798 A1   Aug. 18, 2016

(30) Foreign Application Priority Data
Oct. 7, 2013   (NL) ..................................... 2011565

(51) Int. Cl.
*G02B 6/36*   (2006.01)
*G02B 6/38*   (2006.01)
*G02B 6/42*   (2006.01)

(52) U.S. Cl.
CPC ......... *G02B 6/3869* (2013.01); *G02B 6/3825* (2013.01); *G02B 6/3851* (2013.01);
(Continued)

(58) Field of Classification Search
None
See application file for complete search history.

(56) References Cited

U.S. PATENT DOCUMENTS 2,768,034 A * 10/1956 Skinner ................. F16C 33/201
                                                        384/320
2,956,462 A * 10/1960 Paul ...................... B25B 13/483
                                                         403/18
(Continued)

FOREIGN PATENT DOCUMENTS

EP   0 016 911 A1   10/1980
EP   0 185 413 A1    6/1986
(Continued)

OTHER PUBLICATIONS

PCT International Search Report and Written Opinion, PCT International Application No. PCT/NL2014/050699 dated Jan. 16, 2015.

*Primary Examiner* — Mike Stahl
(74) *Attorney, Agent, or Firm* — McDonnell Boehnen Hulbert & Berghoff LLP

(57) ABSTRACT

The present invention is directed to a device for receiving an object in a reproducible manner, comprising: —a substantially rigid housing comprising an opening configured to receive therein the object to be reproducibly received; —first elastic engaging means comprising a first set of elastic flexure elements which are configured, when the object to be reproducibly received is situated in an engaging state received in the opening, to engage on the circumferential form of the object to be reproducibly received present at that position; —second engaging means which are configured, when the object to be reproducibly received is situated in an engaging state received in the opening, to engage on the circumferential form of the object to be reproducibly received present at that position; and —wherein the first elastic engaging means and the second engaging means are arranged some distance from each other in the opening. Furthermore, the invention is related to a method for manufacturing such a receiving device.

15 Claims, 4 Drawing Sheets

(52) U.S. Cl.
CPC ......... *G02B 6/3865* (2013.01); *G02B 6/3871* (2013.01); *G02B 6/3874* (2013.01); *G02B 6/423* (2013.01)

(56) References Cited

U.S. PATENT DOCUMENTS

| | | | |
|---|---|---|---|
| 4,101,198 A | 7/1978 | Heldt | |
| 4,134,641 A * | 1/1979 | Kao | G02B 6/3834 385/70 |
| 4,186,995 A * | 2/1980 | Schumacher | G02B 6/4292 250/227.24 |
| 4,707,072 A | 11/1987 | Kraakman | |
| 5,243,673 A | 9/1993 | Johnson et al. | |
| 5,425,120 A * | 6/1995 | Peterson | G02B 6/4478 385/104 |
| 5,475,783 A * | 12/1995 | Kurashima | G02B 6/4292 385/92 |
| 5,828,806 A * | 10/1998 | Grois | G02B 6/3869 385/78 |
| 7,628,546 B2 * | 12/2009 | Mine | G02B 6/4292 385/76 |
| 2003/0174918 A1 * | 9/2003 | Suh | F16C 27/02 384/125 |
| 2004/0218872 A1 * | 11/2004 | Low | G02B 6/4292 385/60 |
| 2006/0088247 A1 * | 4/2006 | Tran | G02B 6/3874 385/55 |

FOREIGN PATENT DOCUMENTS

| | | |
|---|---|---|
| EP | 1 733 696 A1 | 12/2006 |
| FR | 2 756 056 A1 | 5/1998 |

\* cited by examiner

RECEIVING DEVICE AND METHOD FOR MANUFACTURING SUCH A RECEIVING DEVICE

CROSS REFERENCE TO RELATED APPLICATIONS

The present application is a national stage entry of PCT/NL2014/050699, filed 7 Oct. 2014, and claims priority to NL 2011565 filed 7 Oct. 2013. The full disclosures of NL 2011565 and PCT/NL2014/050699 are incorporated herein by reference.

The present invention is related to a device for receiving an object in a reproducable manner, and a method for manufacturing such a receiving device.

More particularly, the invention is directed to a receiving device providing an optical fiber ferrule receptacle with an ultra high positional repeatability.

Optical fibers are often equipped with a ferrule on one or both ends to facilitate detachment and reconnection. Some high-end applications require a connector that offers high positional accuracy, repeatability as well as robustness to external factors to a level that is not achieved by currently available fiber ferrule receptacles.

Optical fibers are commonly equipped with a ferrule on one or both ends which functions as a plug that aids in handling and positional restraining of the fiber end. This method using ferrules is used in many standard connectors such as the popular FC, LC and SC connectors.

Connectors are used in three main configurations: where light is coupled from one fiber into another fiber, where light is coupled from a fiber to a free-space system and where light is coupled from a free-space system into a fiber. The following sections discuss each of the configurations, and their specific requirements.

Free-Space to Fiber

In a free-space to fiber configuration, light is coupled from a system where the light propagates through air or vacuum into a fiber. Typical examples of this configuration are coupling of a laser beam from a laser diode, gas laser, or optical isolator into a fiber.

To couple the light into a fiber, the beam must be focused and the focus point positioned at the fiber surface. For optimal coupling of the light into the fiber, the intensity profile of the focused spot must be matched to the mode shape of the fiber with respect to shape, size and positioning. On top of this the incoming beam must be oriented at the right angle to the fiber core. Due to the small diameter of the fiber core and the mode shape, loss of optical power is very sensitive to small positional errors between light beam and fiber. Misalignment in the sub micrometer range can lead to significant optical power loss.

In free-space to fiber couplers, fiber and focus spot are usually aligned to each other using an adjustment mechanism. Applications exist that benefit from the option to attach and reattach the fiber. Especially for short wavelengths or photonic crystal fibers this often leads to high loss due to the misalignment resulting from limited reproducibility when reconnecting the fiber ferrule to the receptacle. Thus in free-space to fiber coupling, reproducibility is critical while absolute positioning is not, due to the presence of the adjustment mechanism.

Fiber to Free-Space

In a fiber to free-space configuration, light is coupled from a fiber into a system where the light propagates through air or vacuum. Typical examples of this configuration are applications where a light source is coupled into an optical measurement instrument, or the transmission of an optical data signal into a receiving unit. Light is emitted from the fiber end-face as a diverging beam, and often needs to be either collimated or refocused, depending on the application.

To obtain a collimated beam, a collimator is placed behind the fiber. The angular alignment of this collimated beam will be sensitive to relative lateral alignment of the fiber core to the collimators optical axis, while the position of the collimated beam will be sensitive to the angle between the beam emitted from the fiber and the collimators optical axis, and the divergence of the collimated beam will be sensitive to the axial location of the fiber end-face to the focal plane of the collimator.

If the beam emitted from the fiber is refocused, the diverging bundle emitted by the fiber is focused by a lens system. In this case, the lateral position of the reimaged spot depends on the lateral alignment of the fiber core relative to the lens system, while the axial focus depends on the distance between the fiber end-face and the lens system.

Because for fiber to free-space systems optical power loss is not affected by alignment, absolute position of the fiber relative to the rest of the system, adjustment of the ferrule position such as encountered in free-space to fiber couplers is often omitted, though not always. Often, if needed at all, the alignment between beam and free-space system will be achieved through adjustment of optical components in the free-space system, or calibration is used.

Some high-end instruments, however, such as highly accurate sensors are sensitive to changes in alignment of these collimated or refocused beams to such an extent that fiber positioning is even more critical than that needed for coupling loss. Therefore some of these systems require either recalibration or realignment after reattachment of the fiber or do not allow for removal of the fiber altogether, because current ferrule receptacles do not achieve acceptable positional reproducibility.

Fiber to Fiber

In a fiber to fiber configuration, light is coupled from a fiber into another fiber. The coupling device is an interconnect unit, in which each fiber is inserted at opposite ends. Requirements for fiber to fiber connections vary per application, but one key performance parameters is loss of optical power at the coupling interface. Misalignment of the fiber is the main driver for loss. Common single mode fibers cores have a diameter of a few micrometer for short wavelengths to typically about ten micrometer for telecom wavelengths. For proper coupling the concentricity between the fiber cores is should be better than a small fraction of that diameter. Absolute position of the fiber cores with respect to the connector's outer mechanics is usually not an important parameter for fiber to fiber connectors.

In many applications, external factors exist that impact the positional stability during use, examples include acceleration, external forces and temperature effects. Ultra high accuracy applications require a connector to achieve high positional accuracy, repeatability as well as robustness to external factors.

Commercially available ferrule receptacle means are: a solid sleeve, a sleeve with grub screw, and a split sleeve. These embodiments and there characteristics are discussed below.

Solid Sleeve

A solid sleeve holds the ferrule in place by fully enclosing the cylindrical outside surface of the ferrule. The most accurate types are made of zirconia. Solid sleeves are mainly used for fiber to free-space and free-space to fiber coupling in devices, and sometimes in fiber to fiber coupling if the alignment requirements are not so demanding, such as in multimode fiber coupling.

To allow insertion and account for manufacturing tolerances, some play between the ferrule and the sleeve is required. Although these sleeves suffice in quite some applications, due to the play between ferrule and sleeve, reproducibility of solid sleeve receptacles is insufficient for applications where high positional accuracy is requirement such as single mode fiber to fiber coupling, single mode free-space to fiber coupling (especially for short wavelengths) and for fiber to free-space applications where good reproducibility is required such as in some high-end metrology equipment. Furthermore this approach requires very tight manufacturing tolerances, and is sensitive to dirt between ferrule and sleeve.

Sleeve with Grub Screw

To resolve the issue of play, a solid sleeve with grub screw holds the ferrule in place using a screw in the sleeve, to be tightened by the operator. This type is usually made of metal to accommodate the grub screw thread, often with a H6 of H7 fit on the hole diameter. This type is sometimes used in high-end devices, mainly for fiber to free-space and free-space to fiber coupling.

Due to the screw there is a dependency on the amount of force applied by the operator, and this method is still sensitive to dirt particles at contact surfaces, displacing the ferrule position by the size of the particle. Furthermore when ferrules with slightly different diameter are inserted, the fiber core is displaced by half the diameter deviation.

On first sight, the ferrule might seem exactly constrained by pushing the play out of the mating, however, the lateral degree of freedom perpendicular to the grub screw axis is actually not kinematically constrained but instead depends on friction to be retained. Therefore, the ferrule position will not exactly reproduce in subsequent matings and will not return to its original position after a disturbance causes lateral slip of the ferrule in the sleeve. Also, the tightening of the grub screw itself applies non-reproducing parasitic forces on the ferrule during tightening which aggravates the problem.

Split Sleeve

The split sleeve principle is based on a thin sleeve with a slightly undersize inner diameter and that has been cut open along the axis. Hence, the ferrule is held in place by the elastic forces of the sleeve and ideally the sleeve makes contact over the full inner surface if the size and shape of ferrule and sleeve form an exact match.

While this principle resolves the issue of play to some extent, it is still sensitive to dirt between contact surfaces due to the large contact area, and does need the components to be manufactured to tight tolerances. Also the radial stiffness of a thin walled tube that is open on one side is relatively low, so that parasitic lateral forces, for example as produced by the axial pretension spring in the connector, can cause relatively large lateral displacements.

In combination with friction between the ferrule and the sleeve, a split sleeve is vulnerable to hysteresis: when a disturbing force, whether during insertion or during operation, causes the ferrule to slip in lateral direction within the sleeve, friction causes the ferrule to remain in that position unless the restoring force provided by the radial stiffness is large enough to cause slip. Because the radial stiffness is low compared to the tangential stiffness, the hysteresis can be large enough to degrade performance for high-end applications.

If the size of the ferrule does not exactly match the size of the split sleeve, or when the shape is not perfect, contact pressure can vary greatly over the ferrule circumference. This can further increase hysteresis, because the friction in one direction might be higher than nominal, whereas the stiffness that is to retain the ferrule in that direction might be nominal, or even lower than nominal.

Other Solutions

Various other solutions exist, but none resolve the problems in their entirety. The solutions depend on large contact surfaces or elastic forces on the ferrule, and are as such sensitive to dirt particles, hysteresis due to friction and play.

While technology has supported high accuracy in manufacturing, none of the currently available forms support the high accuracy needed in demanding application combined with robustness to external factors.

When high positional repeatability is required for new high end metrology applications, the connectors currently on the market face significant disadvantages, such as limited accuracy and/or limited reproducibility and/or limited robustness. Some issues are discussed in detail below.

Dirt

Dirt can consist of solid particles or greasy film. Particles may be produced by multiple mating cycles of the connector itself or the connector parts may be contaminated by particles present in the environment, while greasy films/paste can originate from manually handling the ferrule. There are two ways in which dirt can affect performance: positional accuracy, stability and/or repeatability is degraded when dirt ends up between sleeve and ferrule, while the optical performance of the fiber end-face may be affected if dirt ends up on the entrance or exit surface of the core, either by simply obstructing the light path or even non-reversibly by burning into the surface.

In the above mentioned current receptacle embodiments (almost) the whole outer surface is covered by the receptacle. Hence, if dirt is present, there is a large chance it will end up between surfaces that determine the ferrule position. This will not only affect initial positioning, but it will also affect positional stability if particles move due to external disturbances and when greasy residue/paste moves slowly from between the surfaces due to the mating forces. Also, during mating cycles the dirt may move, leading to a change in the effect on position thus degrading repeatability.

Furthermore, the only way the dirt can escape from between these surfaces is by axial transport, leading to an increased chance that it will end up on the fiber end-face, where it can degrade optical performance of the fiber end-face.

Hysteresis and Play

Also hysteresis and play have an adverse effect on accuracy and robustness. In this context, by hysteresis it is meant that the positioning of the ferrule at a certain moment in time depends on the history underwent by the ferrule-receptacle assembly prior to that specific time, after the fading of short-term transients. This can be caused by parasitic forces or offsets during insertion, vibration or shock, temperature shock or cycling, or accelerations or disturbing forces after mating.

Hysteresis often arises from play, friction, creep, plastic deformation or a combination of friction effects combined with too low stiffness. Play is often the limiting factor for solid sleeves because of the necessary allowance between the ferrule and the sleeve diameter. Another key source of hysteresis is friction based constraints. If a disturbing force parallel to the surface is applied that is larger than the friction force, slip will occur, so that after the disturbing force is removed, the original position will not be fully restored.

Because these effects lead to non-deterministic positioning, the ferrule position may change during use due to environmental factors of may not reproduce well enough between subsequent matings.

Operational Environment

Various factors in the operational environment may impact the alignment of the device, thus requiring significant robustness. Key factors include external forces and vibrations, manufacturing deviations and human influence. These factors are difficult to predict and to eradicate; hence the design of the ferrule receptacle should be robust to these factors.

The design of the ferrule itself is such that the ferrule with the fiber end is separated mechanically from the larger parts of the structure such as the plug or the cable. This allows the ferrule end to move independently from the rest of the cable, and allows the ferrule end to be constrained separately to support high accuracy. This is required as many forces can act on the device and cabling, caused by gravity on the cable or machine movement and vibration on the devices present in the environment. Acceleration may also play a role. The device must support reliable operation even in these circumstances.

An object of the present invention is to provide a device for receiving an object in a reproducable manner, that is improved relative to the prior art and wherein at least one of the above stated problems is obviated.

Said object is achieved with the device for receiving an object in a reproducable manner according to the invention, comprising:
a substantially rigid housing comprising an opening configured to receive therein the object to be reproducibly received;
first elastic engaging means comprising a first set of elastic flexure elements which are configured, when the object to be reproducibly received is situated in an engaging state received in the opening, to engage on the circumferential form of the object to be reproducibly received present at that position;
second engaging means which are configured, when the object to be reproducibly received is situated in an engaging state received in the opening, to engage on the circumferential form of the object to be reproducibly received present at that position; and
wherein the first elastic engaging means and the second engaging means are arranged some distance from each other in the opening.

Due to the distance between the first and second engaging means, the to be reproducibly received object, e.g. an optical fiber ferrule, is supported at positions that are located a distance away from each other. As a result of at least the first engaging means being elastic engaging means and comprising a set of elastic flexure elements, the object is received in an elastic manner such that elastic averaging occurs. The elastic engaging means are configured to exert a spring force on the to be reproducibly received object, holding it in place without relying on friction for positioning and without any play in the plane perpendicular to the longitudinal axis.

According to a preferred embodiment, the elastic flexure elements of the first elastic engaging means are arranged with a first outer end on the housing and extend therefrom into the opening such that the second outer ends of the flexure elements located opposite the first outer ends arranged on the housing describe in the opening a form which in an untensioned rest state is smaller than the circumferential form of the object to be reproducibly received present at that position in the engaging state. Such flexure elements will have a high stiffness in axial direction, and a low stiffness in the lateral direction. When an object that has to be received in a reproducable manner, e.g. an optical fiber ferrule, is inserted into the opening of the substantially rigid housing, the outer surface of this object will engage with the second outer ends of the flexure elements, which will exert a radial spring force on the to be reproducibly received object, holding said object in place without relying on friction for positioning and also without play in the plane perpendicular to the longitudinal axis. Since the radial contact force exerted by each flexure is normal to the surface, the contribution of the radial contact force to the constraining of the fiber ferrule is not influenced by friction effects.

According to a further preferred embodiment, the second engaging means are elastic engaging means which comprise a second set of elastic flexure elements which are arranged with a first outer end on the housing and extend therefrom into the opening such that the second outer ends of the flexure elements located opposite the first outer ends arranged on the housing describe in the opening a form which in an untensioned rest state is smaller than the circumferential form of the object to be reproducibly received present at that position in the engaging state. If both the first and second engaging means are elastic engaging means, each comprising a set of elastic flexure elements, the to be reproducibly received object is supported by multiple flexure elements along its outer surface. The flexure elements of one of the engaging means are typically arranged around the outer surface of the to be reproducibly received object, whereas the flexure elements of both engaging means are arranged some distance away from each other, providing a secure reliable support without relying on friction for positioning.

According to an even further preferred embodiment, the form described by the second outer ends of the flexure elements of the first and/or second elastic engaging means substantially corresponds to the circumferential form of the object to be reproducibly received present at that position in the engaging state, and in the untensioned rest state this form is smaller than the circumferential form of the object to be reproducibly received such that, when the object to be reproducibly received is situated in a position received in the opening in the engaging state, the flexure elements are tensioned outward within their elastic range and receive the circumferential form therebetween.

According to an even further preferred embodiment, the flexure elements have a tangential stiffness $c_t$ that is smaller than the radial stiffness $c_r$ of said flexure elements.

Hysteresis scales with $c_t/c_r$, and can be reduced to sufficiently small values by choosing $c_t/c_r$ sufficiently small, in practice this means that $c_t \ll c_r$ must be met. Furthermore, if the flexure elements are designed such that $c_t \ll c_r$, the contact points do not slip for occurring lateral disturbance forces or displacements. It is therefore beneficial to dimension the flexure elements such that $c_t \ll c_r$. At least, the flexure elements have a tangential stiffness $c_t$ that is smaller than the radial stiffness $c_r$ of said flexure elements.

According to an even further preferred embodiment, the flexure elements have a tangential width that is oriented in the tangential direction of the opening, and a radial width that is oriented in the radial direction of the opening, wherein the tangential width of said flexure elements is smaller than the radial width of said flexure elements. For an isotropic material, these relative dimensions satisfy that the flexure elements have a tangential stiffness $c_t$ that is smaller than the radial stiffness $c_r$ of said flexure elements.

According to an even further embodiment, the flexure elements are provided with one or more of a notch hinge, a flexural parallelogram, and/or comprises a non-isotropic material. This allows that the criterion $c_t \ll c_r$ may be satisfied, even if the tangential width of said flexure elements is not per se smaller than the radial width of said flexure elements, which might be a design requirement.

According to an even further preferred embodiment, said receiving device comprises one or more further elastic engaging means that comprise a set of elastic flexure elements which are arranged with a first outer end on the housing and extend therefrom into the opening such that the second outer ends of the flexure elements located opposite the first outer ends arranged on the housing describe in the opening a form which in an untensioned rest state is smaller than the circumferential form of the object to be reproducibly received present at that position in the engaging state. By adding one or more further elastic engaging means next to already present first and second elastic engaging means, elastic averaging is further improved while the construction will not become over-constrained such as would be the case when a rigid engaging means would be used such as in conventional mounting methods.

According to an even further preferred embodiment, the flexure elements are shaped to have a small contact area with the to be reproducibly received object in order to obtain a high contact pressure and reducing transfer of a moment between said flexure element and said to be reproducibly received object, and wherein the flexure elements are arranged on a part that is stiffer than the flexure elements in order to prevent that elastic displacement in one flexure via said part results in a displacement of other flexure elements arranged on said part. Although said part may be an intermediate member, preferably said part is the substantially rigid housing.

According to an even further preferred embodiment, at least the substantially rigid housing and the engaging means together form a monolithic unit. This avoids the risk of hysteresis caused by internal displacements along material boundaries. Next to mechanical advantages, constructing the device as a monolithic structure takes away the requirement to assemble, which has a positive effect on production costs.

According to an even further preferred embodiment, each set of elastic flexure elements comprises at least three, and more preferably at least 12, flexure elements.

Due to the number of elastic elements and their placement, any deviations present between the contact area of a flexure and the ferrule leads to much lower impact on the alignment of the fiber than the deviation at the contact. The actual displacement of the ferrule scales inversely with the number of elastic elements around the perimeter, namely as $d_{ferrule} = (2 \cdot D_d)/n$, where $d_{ferrule}$ is the displacement of the ferrule, n is the number of flexure elements and $D_d$ is the size of the deviation. As a result of this behavior, higher numbers of elastic elements lead to reduction of the impact that any small deformations will have on the position of the fiber. In addition to this, disturbances after re-insertion such as dirt between a flexure's contact area and the ferrule will have a greatly reduced impact on overall positioning. As such, the radially placed elastic elements significantly increase the robustness of the device by elastically averaging the impact of displacements at contact surfaces on the misalignment of the fiber core. According to a more preferred embodiment, the number n of flexure elements is at least twenty, more preferably at least thirty and even more preferably at least forty.

According to an even further preferred embodiment, said receiving device further comprises an adjusting mechanism configured for adjusting the radial position and/or radial stiffness $c_r$ of one or more elastic flexure elements.

This embodiment allows fine adjustment of one or more of the flexures, to facilitate accurate manipulation of a ferrule inserted into the flexure array. This adjustment mechanism functions by manipulating one or more flexures of one or more flexure arrays in such a way that this results in a change of the balance of forces exerted on the ferrule by the flexures in the array(s) concerned, which, in conjunction with the flexibility of the flexures in the array, results in a small displacement of the ferrule. There are various ways in which flexures can be manipulated to achieve this effect: a flexure can be manipulated so that the contact point where it contacts the ferrule is shifted radially inward or outward, the stiffness of a flexure can be affected, a force can be exerted on the flexure that is manipulated or a combination thereof.

For the case where the contact point of the flexure is radially shifted, the shift of the ferrule can be expressed as $d_L = 2\, d_f m/n$, where $d_L$ equals the lateral displacement of the ferrule, $d_f$ equals the radial displacement of the contact point of the manipulated flexure(s), m equals the number of manipulated flexures, and n equals the number of flexures in that array. Similar relations can be derived for the cases where force or stiffness of the flexure(s) are manipulated, having in common that the effect of the manipulation of one or more flexures on the position of the ferrule is attenuated by the aforementioned elastic averaging effect. This attenuation has advantages since, for a given accuracy to be achieved in ferrule positioning, it eases requirements regarding the stability and fineness of adjustability of the adjustment means (which could for example be a simple set screw).

According to an even further preferred embodiment, said receiving device further comprises a key and keyway arrangement, wherein the keyway on one side thereof comprises an abutment surface and a spring is arranged on the other side of the key in order to preload the contact between the key and the abutment surface in order to minimalize play between the key and the keyway.

The invention is further directed to a method for manufacturing a receiving device according to any of the foregoing claims, comprising the steps of:
using an additive manufacturing method for forming a monolithic unit of a substantially rigid housing and engaging means comprising a set of elastic flexure elements, wherein at least one of the contact surfaces and/or guiding structures are over-dimensioned;
successively applying an electric discharge machining method to finish at least one of the contact surfaces and/or guiding structures.

According to a preferred embodiment of said method, a tribological coating is applied to at least one of the contact surfaces and/or at least one of the guiding surfaces. Said tribological coating may be used to change various characteristics of the ferrule-receptacle contacts, such as to increase wear resistance, prevent particle pollution and tune the coefficient of friction to improve insertion characteristics, durability and reproducibility.

The invention outlined in this document has resolved the mentioned issues by constructing the ferrule receptacle from a large number of elastic flexure elements placed around the circumference where the ferrule is to be constrained. In one embodiment, the flexure elements together form a round inner diameter that is slightly smaller than the outer diameter of the ferrule to be inserted. This results in an optical fiber connection principle that is compatible with much used standard connector types, while offering higher accuracy, repeatability and robustness than currently available fiber receptacles.

In the following description preferred embodiments of the present invention are further elucidated with reference to the drawing, in which.

Figure 1:
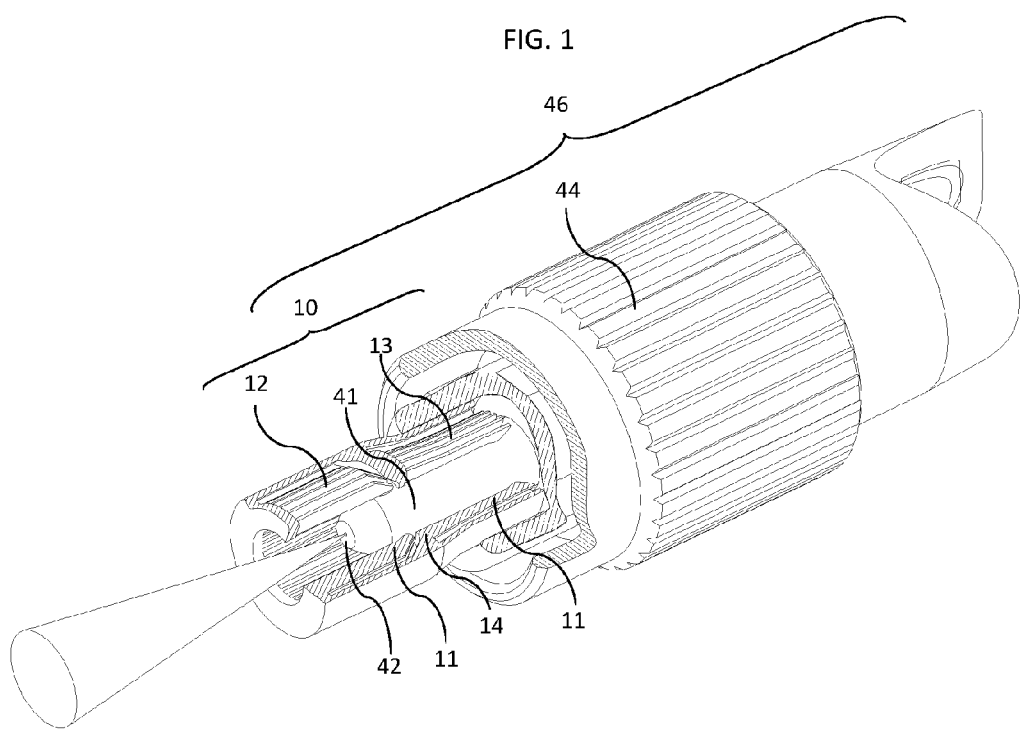
FIG. 1 is a perspective breakout view of a ferrule with attached standard FC connector inserted into an embodiment of a flexure based ferrule receptacle.
Figure 2:
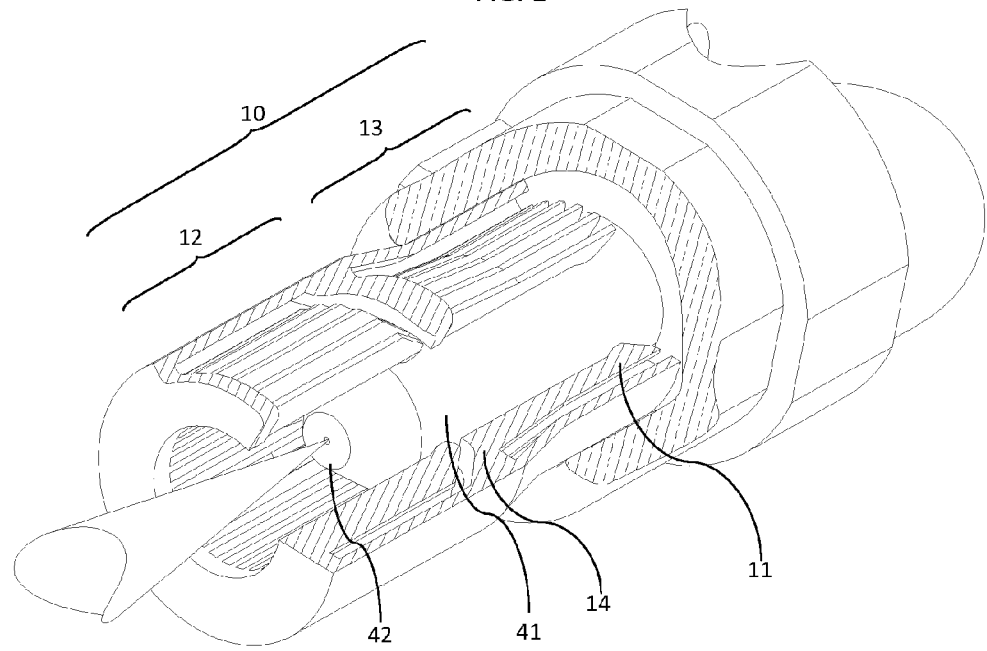
FIG. 2 is a perspective breakout view of a ferrule and some of the parts of an attached standard FC connector inserted into an embodiment of a flexure based ferrule receptacle.
Figure 3:
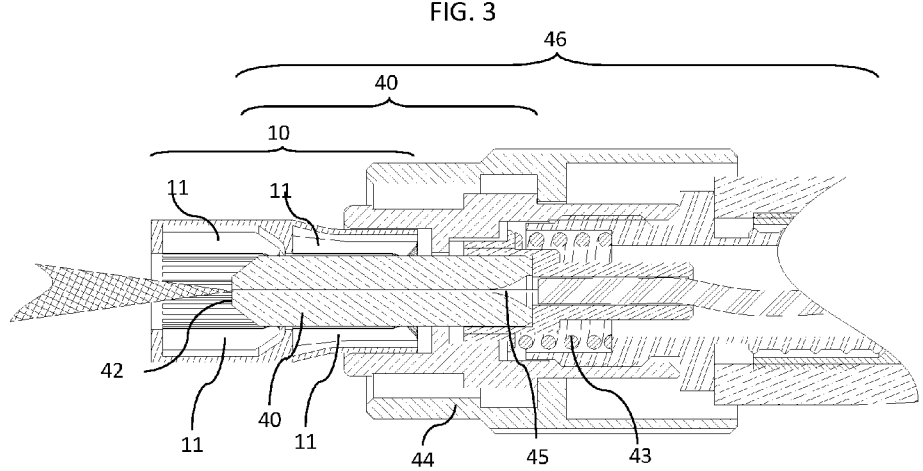
FIG. 3 is a section view along the axis of the ferrule of said ferrule with attached standard FC connector inserted into an embodiment of a flexure based ferrule receptacle.

In the preferred embodiment shown in FIG. 1, the invention comprises at least one circular line array 12 of elastic elements 11 placed at a defined location along the axis 51 enclosing the position where a to be reproducibly received object such as a fiber optic ferrule 40 is to be retained. The skilled person will understand that although a fiber optic ferrule is mentioned in relation to the embodiments shown in the figures, the invention is applicable to like objects that are to be reproducibly received. The flexure elements 11 are created in such a way that the inner diameter described by the elastic elements 11 is slightly smaller than the ferrule 40, which means all elements 11 exert a spring force on the ferrule 40, holding it in place without relying on friction for positioning and without any play in the plane perpendicular to the axis 51.

Improved performance is achieved if, according to a preferred embodiment, at least one circular line array 12 of elastic elements 11 is placed such that it engages the outer locating surface 41 of the ferrule 40 where it is within tight geometrical specifications, and as close as possible to the functional fiber end-face 42. One of the critical advantages of such an elastic element structure over a rigid structure is the absence of play. Another critical advantage is the averaging of displacements due to dirt or imperfect geometry. Due to the number of elastic elements 11 and their placement, any deviations present between the contact area 31 of a flexure 11 and the ferrule 40 leads to much lower impact on the alignment of the fiber 45 than the deviation at the contact 32. The actual displacement of the ferrule 40 scales inversely with the number of elastic elements 11 around the perimeter, namely as $d_{ferrule}=(2 \cdot D_d)/n$, where $d_{ferrule}$ is the displacement of the ferrule 40, n is the number of flexure elements 11 and $D_d$ is the size of the deviation. As a result of this behavior, higher numbers of elastic elements 11 lead to reduction of the impact that any small deformations will have on the position of the fiber 45. In addition to this, disturbances after re-insertion such as dirt between a flexure's contact area 31 and the ferrule 40 will have a greatly reduced impact on overall positioning. As such, the radially placed elastic elements 11 significantly increase the robustness of the device by elastically averaging the impact of displacements at contact surfaces 31 on the misalignment of the fiber core (not shown in figures).

Since the radial contact force exerted by each flexure 11 is normal to the surface 31, the contribution of the radial contact force to the constraining of the fiber ferrule 40 is not influenced by friction effects. In tangential direction however, slip between the contact area 31 and the ferrule 40 is possible, so that friction effects might cause degradation of performance if the flexure array 12 is not dimensioned correctly. Because of this possible slip, there are two effects that can potentially affect positioning of the ferrule 40 negatively.

One effect is that if a certain lateral force is exerted on the ferrule 40 during insertion or if a certain lateral offset between ferrule 40 centerline and array 12 centerline is maintained during insertion, this disturbance will be, at least partly, "frozen" into the contacts 31 because after removal of the lateral force or discontinuing of enforcing the lateral displacement, the flexures 11 will not end up in a state that is stress-free in tangential direction. This leads to hysteresis with respect to insertion disturbances.

Another effect is that is a disturbance causes a lateral displacement and contact point(s) 31 slip(s) in tangential direction this disturbance will be also, at least partly, "frozen" into the contact(s) 31 concerned because the flexure(s) 11 will not end up in a state that is stress-free in tangential direction.

For both effects the average position as defined by only the tangential contributions of all the flexures 11 through the tangential frictional force, does not coincide with the average position as defined by only the radial contributions of all the flexures through the normal contact force. The real resulting position will be determined by the combined influence of the tangential and radial contributions, which works out to be the average between the radial contributions and the tangential contributions weighted by the tangential and radial stiffnesses of the flexures 11 respectively. Hence hysteresis scales with $c_t/c_r$, and can be reduced to sufficiently small values by choosing $c_t/c_r$ sufficiently small, in practice this means that $c_t \ll c_r$ must be met.

The second effect can be prevented altogether by dimensioning the flexures 11 such that the contact points 31 do not slip for occurring lateral disturbance forces or displacements. For forces, this means that the criterion $F_L < 2 \cdot n \cdot \mu \cdot (c_r^2/c_t + c_r) \cdot d_{pt}$ must be met, where $F_L$ is the disturbing lateral force, n is the number of flexure elements 11, $\mu$ is the coefficient of friction between flexure element 11 and ferrule 40, $c_t$ is the tangential stiffness, $c_r$ is the radial stiffness, and $d_{pt}$ is the radial pretention displacement arising from the difference in diameter between flexure array 12 and ferrule 40. For displacements, this means that the criterion $d_L < \mu \cdot c_r/c_t \cdot d_{pt}$ must be met, where $d_L$ is the disturbing lateral displacement, µ is the coefficient of friction between flexure element 11 and ferrule 40, $c_t$ is the tangential stiffness, and $c_r$ is the radial stiffness, and $d_{pt}$ is the radial pretention displacement arising from the difference in diameter between flexure array 12 and ferrule 40. Both these criteria show also that it is beneficial to dimension the flexure elements 11 such that $c_t \ll c_r$.

According to a further preferred embodiment that provides optimal performance, the flexure elements 11 are dimensioned such that above criteria are met, and so that $c_t \ll c_r$. When taking as an example the flexures 11 shaped as depicted in the figures describing the invention, striving for $c_t \ll c_r$ means that in tangential direction the flexure 11 should be considerably thinner than in radial direction. For the case where the flexure 11 consists of a beam with simple rectangular cross section oriented with its beam length oriented in axial direction, the ratio of the tangential stiffness to the radial stiffness, approximately scales as the square of the ratio of tangential thickness to radial thickness, i.e. $c_t/c_r \approx (t_t/t_r)^2$, where $c_t$ is the tangential stiffness, $c_r$ is the radial stiffness $t_t$ is the tangential thickness, and $t_r$ is the radial thickness.

It should be clear to a person skilled in the art that other means and geometries exist that can serve to achieve that $c_t \ll c_r$ is satisfied, such as the use of properly oriented notch hinges, flexural parallelograms or non-isotropic materials (not shown in the figures).

By constraining X and Y translations at another axial location, the ferrule 40 tip/tilt can be constrained so that the fiber end-face 42, which protrudes beyond aforementioned flexure array 12, is constrained in X and Y position. A preferred embodiment is to place a second array of elastic flexure elements 13 at another axial location, preferably engaging the ferrule 40 at the greatest available axial distance from aforementioned flexure array 12 where the ferrule 40 is still within tight geometric specification. If space allows it, more arrays 12, 13 of elastic flexure elements 11 may be placed at even more axial positions, this would further increase the effects of elastic averaging and increase stiffness.

Figure 6:
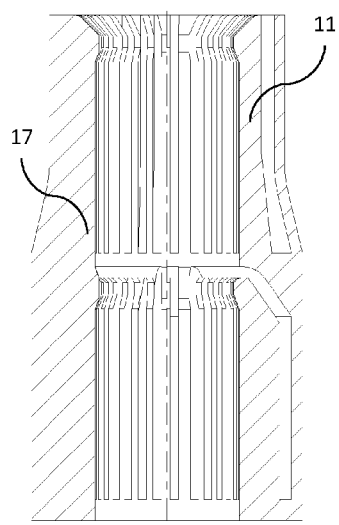
FIG. 6 is a sectioned view though the axis of the ferrule (not visible in FIG. 6) of an embodiment of a flexure based ferrule receptacle.

Preferably the flexures 11 are shaped and attached to the rest of the system so that disturbances such as dirt, geometric imperfections, or diameter changes or differences at a specific location or ferrule 40, do not negatively influence the interaction of flexures 11 with the same or another ferrule 40 at other locations. Thus the influence of local disturbances is restricted to that location so that elastic averaging functions optimally. Hence preferably each flexure element 11 only interacts with the ferrule 40 in one localized region to constrain the ferrule 40 and does not influence other flexures 11. This can be achieved by dimensioning the flexure 11 in such a way that the contact area 31 between flexure 11 and ferrule 40 is small and that the part to which each flexure 40 is attached is stiff in comparison to the flexure 11 itself, which is depicted in FIG. 6.

In addition to elastic averaging, the small contact surface 31 between elastic elements 11 and the ferrule 40 reduces the risk of dirt particles getting between the contact surfaces 31. The small contact surface 31 also leads to high contact pressure, so that if a greasy film exist on the contact surface 31, it will be pushed out of the contact region 31 more effectively than what would be the case with a larger contact surface 31.

The opening between the elastic elements 18 allows dirt to escape from the contact surface 31. In prior art using a solid or split sleeve there is a large chance that dirt will stay in the connector channel between ferrule and walls. If nevertheless, the dirt escapes from the contact surface(s) 31, it will mainly be transported to the front or end openings of said sleeve. In the presented invention the openings between the elastic elements 18 allow the movement of dirt between the elastic elements 11 away from the contact surfaces 31, reducing the chance that dirt effects positioning. In addition, there is also less chance of dirt being transported to the fiber end-face 42 where it may simply block the light path, or severely damage the polished fiber end 42 by burning into it, thus rendering it unusable.

According to a further preferred embodiment that provides optimal performance, the structure is manufactured as a single monolithic element 14, 114, 214. This avoids the risk of hysteresis caused by internal displacements along material boundaries. Next to mechanical advantages, constructing the device as a monolithic structure takes away the requirement to assemble, which has a positive effect on production costs.

Figure 5:
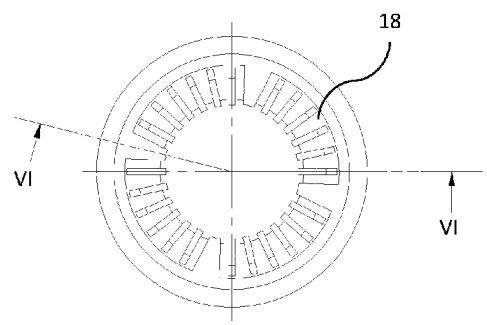
FIG. 5 is an axial view of an embodiment of a flexure based ferrule receptacle.

Expansion and contraction of the materials due to temperature changes will be accommodated by the flexures 11, while retaining function. Due to the absence of play, the elastic deformation of the flexures 11, symmetry of the structure as shown in FIG. 5, and the prevention of slip, the geometry will expand or contract symmetrically in all directions, with minimal positional drift and/or hysteresis of the fiber axis (not shown in figures) position.

The flexure arrays 12, 13 may be manufactured using various methods. One manufacturing method is to lathe a ring from metal such as titanium, and subsequently make a number of radial cuts into the ring that run over part of the length of the ring, using wire EDM by letting the wire cut in axial direction, so that at the bottom a solid ring remains with a plurality of flexures 11 protruding from its top. To make a second set of flexures 11 the other end of the ring may be machined in a similar way, or multiple rings with the monolithically attached flexures 11 can be assembled into a ferrule receptacle 10. Although very accurate parts can be made using this technology, it is quite costly due to the time the machining steps take and due to the assembly.

A solution is provided if, according to a further preferred embodiment, the part 10 is built using an additive manufacturing method. In additive manufacturing, also called 3D printing, complex structures are built by depositing layers of material, rather than removing materials from a base structure or molding. Although elastic averaging attenuates the effects of the currently still relatively large tolerances obtained in additive manufacturing, the receptacle's performance can be further improved by additional machining steps to create a more accurate array of contact points then obtained in the initial manufacturing step in which the approximate form of the receptacle 10 or part thereof is made. This is especially relevant now that additive manufacturing is still an order of magnitude less accurate than some more traditional machining methods. One way of achieving this is by slightly over-dimensioning some of the critical dimensions in the additive manufacturing step and then applying electric discharge machining to accurately finish these features. This might be useful for parts of the flexures, the contact surfaces and the rigid guiding structures 17, 116.

The device can be dimensioned to support the specifications of commercially available ferrules and related connector types. The devices mentioned can be produced as stand-alone devices as shown in the figures, as well as subcomponents or sub-designs of other devices.

In a further preferred embodiment, a tribological coating is applied to at least the contact surfaces 31 and/or 32 and/or guiding surfaces 17, 116. This can be used to change various characteristics of the ferrule-receptacle contacts, such as to increase wear resistance, prevent particle pollution and tune the coefficient of friction to improve insertion characteristics, durability and reproducibility.

To constrain the rotation around the fiber axis (not shown), a key and keyway system is often used in commercially available connector systems and measures. According to a further preferred embodiment of the invention, this key (not shown) and keyway 121 is improved by adding a spring system 123 on one side of the keyway 121. With the addition of this spring, the "plug" 46 is rotated towards the unique orientation as defined by the rigid contact surface 122 on the opposite side of the key. In the case of systems using a rotating part for locking the connector in place, such as by means of a nut 44 that screws onto thread 124 connected to the ferrule receptacle 10 or a bayonet closure (not shown), positioning the elastic element 123 such that the spring force is directed in the same way as the frictional forces caused by the rotational movement during attaching further adds to the reproducibility of the axial rotation. In a further embodiment a rigid key guiding structure 125 is added close to the flexure element 123 used for loading the rigid keyway contact surface 122 to protect this flexure element 123 from plastic deformation due to excessive bending.

Figure 4:
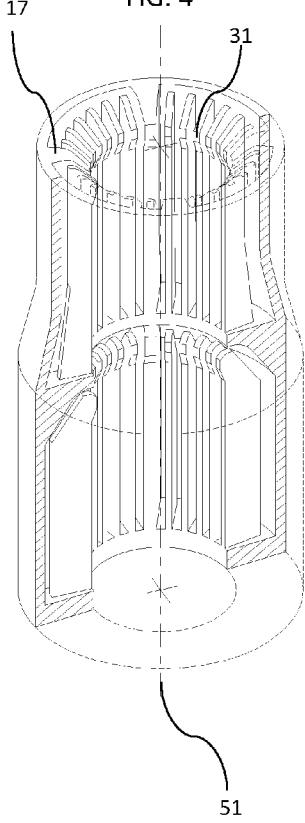
FIG. 4 is a perspective sectioned view of an embodiment of a flexure based ferrule receptacle.
Figure 7:
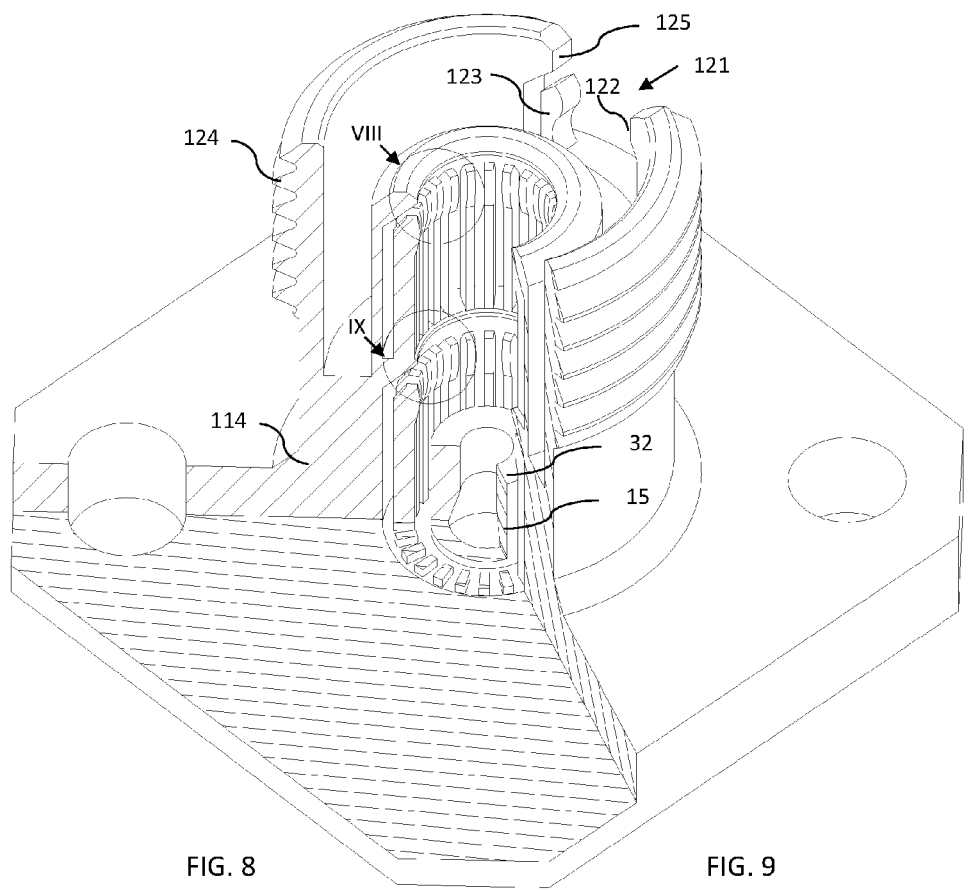
FIG. 7 is a perspective view of perspective breakout view of an embodiment of a flexure based ferrule receptacle monolithically integrated with thread and flexure base keyway system for use with nut and key system found on common standard fiber connectors.
Figure 8:
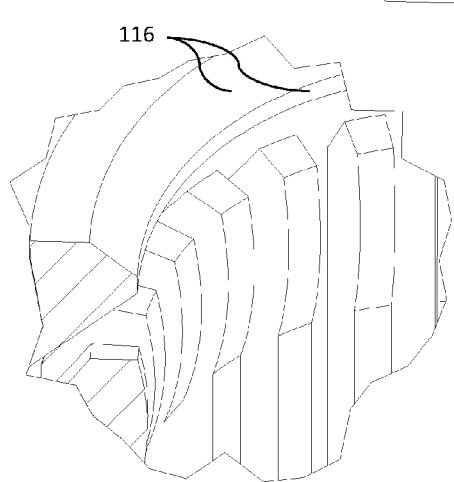
FIG. 8 is a perspective detail view of FIG. 7 showing an embodiment of a rigid ring-shaped guiding structure.
Figure 9:
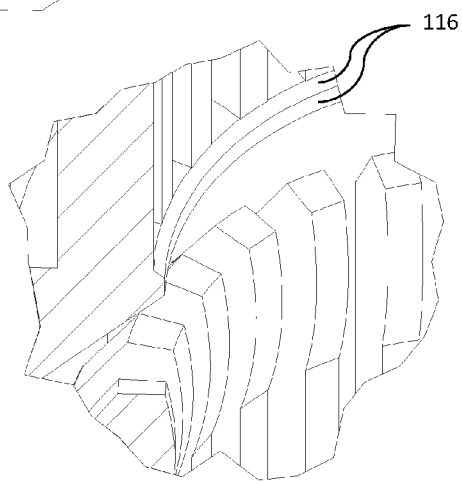
FIG. 9 is a perspective detail view of FIG. 7 showing an embodiment of a rigid ring-shaped guiding structure.

Support of the insertion of the ferrule and protection of the flexural structures is obtained, if according to an even further preferred embodiment, one or more guiding elements are arranged in the device. These guiding elements can be ring shaped 116 as depicted in FIGS. 7, 8 and 9, or can consist of at least three arc segments or radial ribs 17 as depicted in FIGS. 4, 5 and 6, to guide the ferrule 40 for easy insertion, but also protect the elastic elements 11 from plastic deformation due to misaligned or rough insertion. For best results the rings 116 should be significantly stiffer than the flexure elements 11, be placed close to the contact surfaces of elastic arrays 12, 13 and be dimensioned such that after insertion they will not touch the ferrule 40 so that accurate positioning is achieved by the flexure elements 11 alone.

According to a further preferred embodiment for free-space to fiber or vice versa, an axial stop 15 constrains the ferrule 40 in axial direction by means of a contact surface 32. This contact surface 32 is pre-tensioned by the ferrule spring 43 included in standard connectors. The axial stop 15 is preferably designed to match the specific geometry of the ferrule 40. For straight polished physical contact ferrule tips 42, the axial stop ring 15 is constructed perpendicular to the fiber axis (not shown), though for angled physical contact ferrule ends 42 the axial stop 15 features match the angled polished fiber end 42.

According to a further preferred embodiment, the axial stop 15 is created in such a way that the contact surface 32 between the ferrule 40 and the axial stop 15 itself allows small movements of the ferrule 40 in lateral directions while constraining axial movement, thus further preventing friction in lateral direction that would influence lateral constraining of the ferrule 40. In an embodiment this is achieved placing a number of axially oriented strut flexures arising from the base that determine the axial position of the ferrule end-face 42 when inserted (not shown in the figures). These elements have low stiffness in the lateral direction, but high stiffness in the axial direction, thus determining axial position of the ferrule 40 while avoiding hysteresis-causing stick-slip effects at the axial stop contact surface 32.

Preferably the receptacle 10 is built from a material with a high ratio of yield strength to E-modulus, such as Titanium alloys or certain types of steel. This allows higher strain before plastic deformation and as such offers more freedom for designing the flexure elements 11 while preventing plastic deformation. An added benefit of some of these materials is that their coefficient of thermal expansion is close to that of Zirconia often used in ferrules, thus keeping difference in thermal expansion between ferrule and receptacle limited. Furthermore, some of these materials are suitable for 3D printing with tight dimensional tolerances and fine features, opening a way to produce the receptacle 10 in an economic way.

Figure 10:
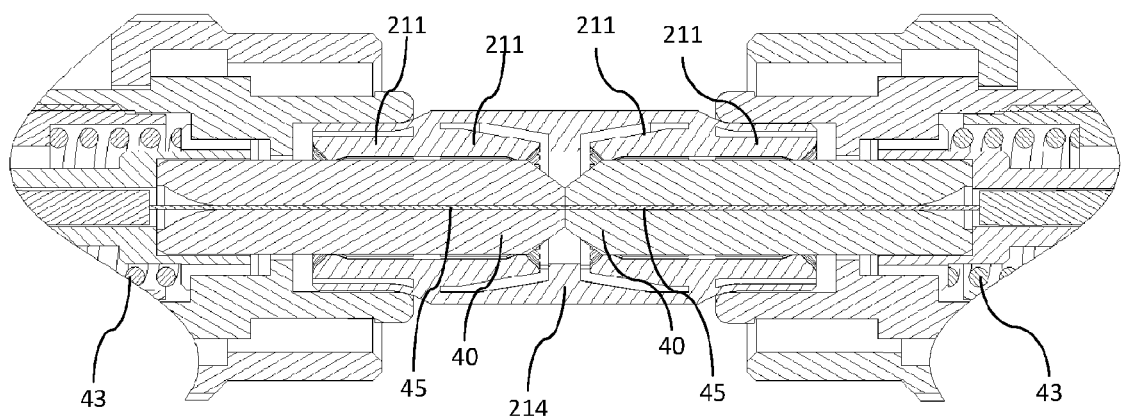
FIG. 10 is a sectioned view though the axis of two ferrules showing two ferrules with attached standard FC connector and an embodiment of a flexure based fiber-to-fiber coupling.

For fiber-to-fiber connections, the principles outlined above still hold, however the structure needs to be created twice in such a way, and possibly without the axial stop, so that both ferrules can abut with their functional surfaces or an optical coupling element or system. FIG. 10 depicts such a fiber-to-fiber embodiment. For the application of fiber to fiber connection, fiber to fiber concentricity is especially important. By producing all the contacting surfaces in one machining operation, whether during initial manufacturing or by a finishing operation such as EDM, broaching or abrasive processing, the contact surfaces can be made such that they have very good alignment relative to each other, in turn resulting in very good concentricity of the fiber ferrules 40. Contrary to fiber to free-space and free-space to fiber couplings, in the case of fiber to fiber coupling the absolute position of the fibers 45 is not important, and does not necessary need to be constrained, as long as the ferrules are kept concentric to each other.

Summarizing, the invention outlined in this document provides ultra high accuracy in optical fiber ferrule 40 constraining, while retaining the ability to reliably de- and re-attach with high positional repeatability. The solution presented resolves aforementioned issues and covers a connector principle usable for commercially available ferrule and connector types.

These properties are achieved by the receptacle 10, which combines one or more of the following features/characteristics:

- A sufficiently large number of flexure elements 11, 211 are elastically deformed when engaging the ferrule 40 in a way so that no play is present and so that geometrical imperfections, whether part of the ferrule 40, receptacle 10, or due to damage, limited manufacturing tolerances or the presence of dirt, are attenuated through elastic averaging. The number of flexure elements 11, 211 needed to achieve sufficient attenuation of these geometric imperfections depends on the severity of the geometric imperfections and on the required repeatability, and can be chosen accordingly. Theoretically, three flexures 11, 211 suffice for the receptacle 10 to function. For high end applications however, it is expected that in practice at least tens of flexures 11, 211 are required.
- Preferably flexures 11, 211 are shaped, dimensioned, oriented and made of material such that $c_f \ll c_r$.
- Preferably the contact areas 31 between ferrule 40 and connector 10 are small, reducing risks associated with dirt.
- Preferably the elements 11, 211 retaining the ferrule 40 are arranged in a rotationally symmetric manner, so that different diameter ferrules 40 are positioned with their centerlines coaxially aligned, and so that ferrule 40 alignment is preserved also during thermal cycling. This is achieved because differences in diameter and differences in expansion between fiber 45 and receptacle 10 are accommodated by elastic deformations of the flexures 11, 211 that are symmetric around the centerline 51.

Preferably functional unit 10, is made monolithic, thus preventing hysteresis and/or drift due to local creep, slip or plastic deformation at interfaces between parts with different mechanical properties (such as stiffness) or thermal properties (such as the coefficient of thermal expansion or thermal conductivity). For example, flexures 11, 211 that are loosely arranged inside an outer housing can slip inside this outer housing because of which the absolute position might not reproduce.

Preferably the flexure arrays 12, 13 are protected by guidance structures 17, 116 that protect the flexure elements 11, 211 from plastic deformation during insertion, and make sure that the ferrule 40 is inserted with little lateral offset from the axis 51 of the flexure array 12, 13; this improves accuracy and repeatability if significant (parasitic) lateral forces are exerted on the ferrule 40 during mating.

For connector types that feature a key and keyway mating and where rotational accuracy is important, preferably an elastic flexure 123 can be added to preload the mating between key (not shown in figures) and keyway 121, such that all play is consistently removed on one side of the key (not shown in figures), thus exactly constraining the rotation of the connector 10. In the case that the connector (not shown in figures) is attached by a rotational movement such as when using a nut 44 or a bayonet type fixation (not shown in figures), the flexure 123 is preferably placed such that the spring force works in the same direction as the friction force exerted by the rotation during attaching.

Preferably the receptacle 10, is build from a material with a high ratio of yield strength to E-modulus (for example Ti6Al4V or certain types of steel, such as maraging steel or some spring steels). These materials offer more freedom for designing the flexure elements 11 while preventing plastic deformation. An added benefit of Ti6Al4V or certain types of steel is that the CTE is close to that of Zirconia, thus keeping differences in thermal expansion limited. Furthermore, some of these materials are suitable for 3D printing with tight dimensional tolerances and fine features, opening a way to produce the receptacle 10 in an economic way.

In the above description, the array/arrays 12, 13 of flexural features 11 has/have been described as a circular array for use with circular ferrules 40. It will be clear to someone skilled in the art that the same advantages or some of the same advantages can be obtained by using arrays and/or ferrules with different shapes, such as triangular, square, rectangular, hexagonal, etcetera, or even with uneven shapes (not shown in the figures), as long as the array and the ferrule are properly dimensioned relative to each other, i.e. they have mating forms.

Although they show preferred embodiments of the invention, the above described embodiments are intended only to illustrate the invention and not to limit in any way the scope of the invention. It is particularly noted that the skilled person can combine technical measures of the different embodiments. The scope of the invention is therefore defined solely by the following claims.

What is claimed is:

1. Device for receiving an object, comprising:
    a substantially rigid housing comprising an opening configured to receive therein the object;
    first elastic engaging member comprising a first set of elastic flexure elements extending in an axial direction of said opening, and which are configured, when the object to be received is situated in an engaging state received in the opening, to engage on the circumferential form of the object to be received present at that position;
    second engaging member which is configured, when the object to be received is situated in an engaging state received in the opening, to engage on the circumferential form of the object to be received present at that position;
    wherein the first elastic engaging member and the second engaging member are arranged some distance from each other in the opening; and
    wherein the flexure elements have a tangential stiffness Ct that is smaller than a radial stiffness Cr of said flexure elements.

2. Receiving device according to claim 1, wherein the first set of elastic flexure elements of the first elastic engaging member are arranged with a first outer end on the housing and extend therefrom into the opening such that the second outer ends of the flexure elements located opposite the first outer ends describe in the opening a form which in an untensioned rest state is smaller than the circumferential form of the object to be received present at that position in the engaging state.

3. Receiving device according to claim 1, wherein the second engaging member is elastic engaging and which comprises a second set of elastic flexure elements which are arranged with a first outer end on the housing and extend therefrom into the opening such that the second outer ends of the flexure elements located opposite the first outer ends arranged on the housing describe in the opening a form which in an untensioned rest state is smaller than the circumferential form of the object to be received present at that position in the engaging state.

4. Receiving device according to claim 3, wherein the form described by the second outer ends of the flexure elements of the first and/or second elastic engaging members substantially corresponds to the circumferential form of the object to be received present at that position in the engaging state, and in the untensioned rest state this form is smaller than the circumferential form of the object to be received such that, when the object to be received is situated in a position received in the opening in the engaging state, the flexure elements are tensioned outward within their elastic range and receive the circumferential form therebetween.

5. Receiving device according to claim 1, wherein the flexure elements have a tangential width that is oriented in the tangential direction of the opening, and a radial width that is oriented in the radial direction of the opening, wherein the tangential width of said flexure elements is smaller than the radial width of said flexure elements.

6. Receiving device according to claim 1, wherein the flexure elements are provided with one or more of a notch hinge, a flexural parallelogram, and/or comprises a non-isotropic material.

7. Receiving device according to claim 1, comprising one or more further elastic engaging members that comprise a set of elastic flexure elements which are arranged with a first outer end on the housing and extend therefrom into the opening such that the second outer ends of the flexure elements located opposite the first outer ends arranged on the housing describe in the opening a form which in an untensioned rest state is smaller than the circumferential form of the object to be received present at that position in the engaging state.

8. Receiving device according to claim 1, wherein the flexure elements are shaped to have a small contact area with the to be received object in order to obtain a high contact pressure and reducing transfer of a moment between said flexure element and said to be received object, and wherein the flexure elements are arranged on a part that is stiffer than the flexure elements in order to prevent that elastic displacement in one flexure via said part results in a displacement of other flexure elements arranged on said part.

9. Receiving device according to claim 1, wherein at least the substantially rigid housing and the first engaging member together form a monolithic unit.

10. Receiving device according to claim 1, wherein each set of elastic flexure elements comprises at least three flexure elements.

11. Receiving device according to claim 1, further comprising an adjusting mechanism configured for adjusting the radial position and/or radial stiffness $C_r$ of one or more elastic flexure elements.

12. Receiving device according to claim 1, further comprising a key and keyway arrangement, wherein the keyway on one side thereof comprises an abutment surface and a spring is arranged on the other side of the key in order to preload the contact between the key and the abutment surface in order to minimalize play between the key and the keyway.

13. Method for manufacturing a receiving device, comprising the steps of:
providing the receiving device having a substantially rigid housing comprising an opening configured to receive therein the object to be reproducibly received;
first elastic engaging member comprising a first set of elastic flexure elements extending in an axial direction of said opening, and which are configured, when the object to be received is situated in an engaging state received in the opening, to engage on the circumferential form of the object to be received present at that position;
second engaging member which is configured, when the object to be received is situated in an engaging state received in the opening, to engage on the circumferential form of the object to be received present at that position;
wherein the first elastic engaging member and the second engaging member are arranged some distance from each other in the opening; and
wherein the flexure elements have a tangential stiffness $C_t$ that is smaller than a radial stiffness $C_r$ of said flexure elements;
using an additive manufacturing method for forming a monolithic unit of a substantially rigid housing and engaging means comprising a set of elastic flexure elements, wherein at least one of contact surfaces and/or guiding structures are over-dimensioned; and
successively applying an electric discharge machining method to finish at least one of contact surfaces and/or guiding structures.

14. Method according to claim 13, wherein a tribological coating is applied to at least one of the contact surfaces and/or at least one of the guiding surfaces.

15. Receiving device according to claim 1, wherein each set of elastic flexure elements comprises at least 12 flexure elements.

* * * * *